United States Patent [19]

MacKinnon

[11] 4,081,266
[45] Mar. 28, 1978

[54] STABLE FLUID SUSPENSION FERTILIZER COMPOSITION AND METHOD FOR PRODUCING SAME

[75] Inventor: H. C. MacKinnon, Tulsa, Okla.

[73] Assignee: Agrico Chemical Company, Tulsa, Okla.

[21] Appl. No.: 642,776

[22] Filed: Dec. 22, 1975

[51] Int. Cl.² ............................................. C05B 7/00
[52] U.S. Cl. ..................................... 71/36; 71/64 C; 423/310; 423/313
[58] Field of Search ................... 71/29, 30, 34, 36, 43, 71/44, 64 C; 423/308, 309, 310, 312, 313

[56] References Cited

U.S. PATENT DOCUMENTS

| | | | |
|---|---|---|---|
| T911,008 | 5/1973 | Gettsinger | 71/64 C |
| 2,814,556 | 11/1957 | Christoffel | 71/29 |
| 2,950,961 | 8/1960 | Striplin | 71/64 C |
| 2,964,394 | 12/1960 | Haslam | 71/43 |
| 3,015,552 | 1/1962 | Striplin | 71/43 |
| 3,019,099 | 1/1962 | Walters | 71/29 |
| 3,022,153 | 2/1962 | Miller | 71/29 |
| 3,041,160 | 6/1962 | Makower | 71/43 |
| 3,096,168 | 7/1963 | Waters | 71/34 |
| 3,109,729 | 11/1963 | Slack | 71/43 |
| 3,113,858 | 12/1963 | Slack et al. | 71/64 C |
| 3,179,496 | 4/1965 | Skinner | 71/43 |
| 3,226,184 | 12/1965 | Brownlie | 71/43 |
| 3,234,005 | 2/1966 | Smalter | 71/64 C |
| 3,307,934 | 3/1967 | Palmer | 71/43 |
| 3,326,666 | 6/1967 | Walters | 71/29 |
| 3,384,470 | 5/1968 | Reynolds | 71/36 |
| 3,563,723 | 2/1971 | Sackett | 71/43 |
| 3,656,931 | 4/1972 | Dancy | 71/64 C |
| 3,813,233 | 5/1974 | Kendrick | 71/64 C |

Primary Examiner—Charles N. Hart
Assistant Examiner—Ernest G. Therkorn
Attorney, Agent, or Firm—Richards, Harris & Medlock

[57] ABSTRACT

An improved, stable, aqueous suspension fertilizer composition is provided containing from about 8 to about 75 weight percent monoammonium phosphate, from about 1 to about 6 weight percent ammonia, and from about 1 to about 3 weight percent clay. The composition has a total equivalent water content in the range of about 25 to about 60 weight percent. When desired, additional ingredients such as an aqueous urea-ammonium nitrate solution, having a nitrogen content of about 28 to about 32 percent, and potash can be employed. The composition is further characterized in that the mole ratio of ammonia to phosphoric acid equivalent is maintained in the range of from about 1.2:1 to about 1.8:1. The composition is produced by admixing the ingredients in an agitator-equipped mixing vessel for an effective period of time and under suitable agitation conditions to form a suspension.

12 Claims, No Drawings

STABLE FLUID SUSPENSION FERTILIZER COMPOSITION AND METHOD FOR PRODUCING SAME

BACKGROUND OF THE INVENTION

This invention relates to an improved, stable, fluid suspension fertilizer composition and to a method for producing same. In one aspect the invention relates to an improved, stable, aqueous suspension fertilizer composition wherein monoammonium phosphate is employed as the source of phosphate and the monoammonium phosphate is reacted with ammonia in an amount effective to produce mole ratios of ammonia to phosphoric acid equivalent in the range of about 1.2:1 to about 1.8:1. In yet another aspect the invention relates to a method for producing improved, stable, aqueous suspension fertilizer compositions containing monoammonium phosphate as the phosphate source wherein the composition is formed by admixing the ingredients in an agitator equipped mixing vessel for a period of time effective to form a suspension. In still another aspect the invention relates to a method for producing improved, stable aqueous suspension fertilizer compositions containing monoammonium phosphate wherein the composition is formed by admixing the ingredients in an agitator-equipped mixing vessel wherein the rim speed of the agitator is at least 5,000 feet per minute.

Liquid mixed fertilizers have long been known in the art. In recent years, the use of multi-nutrient liquid mixed fertilizers has grown rapidly. However, such liquid mixed fertilizers have encountered serious drawbacks, when compared with the well established solid mixes or straight nitrogen liquid fertilizers. One major problem of liquid mixed fertilizers of the prior art has been the complex solubility characteristics of such fertilizer compositions. Because of complex solubility problems, crystallization (commonly called "salting out") has occurred during storage and transportation of liquid mixed fertilizers and these crystals have often clogged transfer or application equipment. In efforts to prevent such salting out, the compositions of the prior art have employed the use of polyphosphate compounds. In such formulations the polyphosphates are used as the sole source of phosphate or in combination with orthophosphates in the liquid mixed fertilizer compositions because of the desirability to obtain a higher solubility. When employing polyphosphates in the preparation of liquid mixed fertilizer compositions external heating and cooling of the reaction vessel have often been required to achieve favorable process conditions. Thus, the prior art methods of producing liquid mixed fertilizer compositions have often been limited in production rate because of temperature control requirements.

Because of the demand for additional crop production in the world market today, new fertilizer compositions and methods for producing same are constantly being sought. Especially desirable would be a mixed liquid fertilizer composition not requiring the conventional polyphosphate constituents and phosphoric acid. It is to an improved liquid mix fertilizer composition which does not require the use of phosphoric acid or polyphosphates that the present invention is directed.

SUMMARY OF THE INVENTION

According to the present invention an improved, stable, fluid suspension fertilizer composition is provided wherein the sole source of phosphate of the composition is monoammonium phosphate. Further according to the invention an improved, stable, aqueous suspension fertilizer composition is provided which contains from about 8 to 75 weight percent monoammonium phosphate, an amount of ammonia effective to provide a mole ratio of ammonia to phosphoric acid equivalent in the composition of from about 1.2:1 to about 1.8:1, and from about 1 to about 3 weight percent clay. Further according to the invention a method for producing stable, aqueous suspension fertilizer composition is provided wherein the total equivalent water of the composition is from about 25 to 60 weight percent which comprises admixing into an aqueous solution, in an agitator-equipped mixing vessel wherein the rim speed of the agitator is at least 5,000 feet per minute, from about 8 to about 75 weight percent monoammonium phosphate, an amount of ammonia effective to provide a mole ratio of ammonia to phosphoric acid equivalent in the range of about 1.2:1 to about 1.8:1, from about 1 to about 3 weight percent clay, and from about 0 to 50 weight percent potash.

DETAILED DESCRIPTION OF THE INVENTION

In the preparation of stable fluid suspension fertilizer compositions it has now been found that an improved fertilizer composition can be produced which does not require supplemental heating and cooling and which employs monoammonium phosphate as the phosphate source for such fertilizer composition. In producing the improved stable fluid suspension fertilizer compositions of the present invention it is preferred that the ingredients be admixed in a mixing vessel equipped with an agitator wherein the speed of the agitator is maintained at a sufficient speed to substantially shear the clay particles. While this shear speed can vary, it has been found desirable that the rim speed of the agitator be maintained in the order of at least 5,000 feet per minute.

Any suitable mixing vessel having an agitator can be employed. The mixing time of the ingredients will vary depending upon the rim speed of the agitator of the mixing vessel. One especially suitable mixing vessel is that described in U.S. Pat. No. 3,744,765, entitled "Turbine Mixer" issued to Max L. Bard, on July 10, 1973 and hereinafter incorporated by reference. In this reference, a turbine mixer is provided in which a turbine type impeller is immersed in a vat containing liquids and solids to be mixed. The turbine, when rotating in liquids of differing viscosities, tends to either produce a vortex or open space such as would starve the intake side of the turbine and prevent its operation, or overfill the vortex producing excessive load factors. A pump is provided to draw material either from the side of the vat or from the bottom of the vortex and pump it to the opposite position to control the vortex. By employing such a turbine mixer one is able to obtain a shear speed of the impeller of at least 5,000 feet per minute.

In producing the improved stable fluid suspension fertilizer compositions of the present invention a mixing vessel is charged with an aqueous solution in a predetermined amount. The aqueous solution employed can be water, an aqueous solution containing an effective amount of urea-ammonium nitrate to provide a nitrogen content in the aqueous solution of from about 28 to 32 percent, or a mixture of both. When employing a mixture of water and the aqueous urea-ammonium nitrate solution as the aqueous solution, up to about 80% of the aqueous mixture can be the urea-ammonium nitrate solution, preferably from about 2 to about 53 percent. The amount of aqueous solution employed will vary depending upon the amount of ingredients added to the aqueous solution. However, it should be noted that the fertilizer composition produced will have a total equivalent water of from about 25 to about 60 weight percent. The term "equivalent water" as used herein is to be understood to mean total water content resulting from free water and chemically combined water. Once the aqueous solution has been introduced into the mixing vessel, agitation is commensed, and thereafter, from about 8 to about 75 weight percent, preferably from about 8 to about 27 weight percent, of monoammonium phosphate, in particulate or granular form, is introduced into the aqueous solution. The particle size of the monoammonium phosphate can vary widely. However, in producing the stable, aqueous suspension fertilizer compositions of the present invention it is desirable that the particle size of the monoammonium phosphate be in the order of 0.25 inches in diameter or less. After the desired amount of monoammonium phosphate has been added to the aqueous solution under the prescribed agitation conditions, the agitation is continued until a resulting suspension of the monoammonium phosphate in the aqueous solution is obtained. Thereafter, an effective amount of ammonia is incorporated into the suspension to provide a mole ratio of ammonia to phosphoric acid equivalent in the range of about 1.2:1 to about 1.8:1. The amount of ammonia employed can vary widely but will generally be present in an amount of from about 1 to about 6 weight percent. Especially desirable results have been obtained wherein the amount of ammonia employed was from about 1 to about 3 weight percent. The term "phosphoric acid equivalent" as employed herein is understood to be the theoretical amount of phosphoric acid calculated as formed in situ from the monoammonium phosphate. The ammonia, added to the aqueous monoammonium phosphate dispersion, can be in either the liquid or vapor state. However, since the action between the monoammonium phosphate and the ammonia is an exothermic reaction, it has been found desirable, in producing the stable, aqueous suspension fertilizer compositions of the present invention, that the ammonia be added at a rate sufficient to insure that the temperature of the reaction product does not exceed about 130° F. When the reaction temperature of the dispersion of monoammonium phosphate materials in the aqueous solution with the ammonia is controlled by the amount and rate at which the ammonia is reacted with the monoammonium phosphate one can produce a fertilizer composition having greatly reduced salting out properties. The reaction temperature is further controlled by the ammonia rate to insure that the final product temperature after addition of all ingredients does not exceed 100° F. and is preferably less than 90° F.

After the ammonia has been admixed with the monoammonium phosphate dispersion, clay is added to the ammoniated dispersion. While the amount of clay incorporated into the fertilizer composition can vary widely, such is generally employed in an amount of from about 1 to 3 weight percent, preferably about 2 weight percent. When the clay has been thoroughly admixed into the ammoniated monoammonium phosphate dispersion one can, when desired, incorporate potash into the composition. The amount of potash incorporated can vary widely depending upon the properties of the fertilizer composition desired. For example, potash can be incorporated into the stable fluid suspension fertilizer composition of the present invention in an amount of from 0 to about 50 weight percent, preferably from about 23 to about 40 weight percent. The potash employed is the unrefined potash commonly known as muriate of potash. The particle size of the potash is preferably less than 0.25 inch in diameter.

Once the composition has been formed, it may be desirable to incorporate additional water into the composition so that the total equivalent water of the composition is within the range of from about 25 to about 40 weight percent. When additional water is required to adjust the total equivalent water content of the composition, such can be achieved by incorporating the amount of water required into the aqueous dispersion containing the fertilizer composition and the mixture agitated until uniformity has been achieved.

As previously mentioned, in producing stable, aqueous suspension fertilizer compositions containing monoammonium phosphate, care must be exercised to prevent the temperature of the reaction product from exceeding 130° F. and the final product from exceeding 100° F. if one is to obtain the desired product having reduced "salting out" properties. Such can normally be controlled by the rate of addition of the ammonia. However, when it is determined that the temperature of the final product will exceed about 100° F., one can readily incorporate into the composition from about 1 to about 10 weight percent of a compound having nutrient properties and a negative heat of solution without deleterious effects on the fertilizer composition. While any suitable compound can be employed which has nutrient properties and a negative heat of solution, it is preferred that the compound be ammonium nitrate, urea, potassium cloride, potassium magnesium sulfate, potassium sulfate, or potassium phosphate. When employing ammonium nitrate or urea as the compound to lower and thus control the reaction product temperature, one can, if desired, reduce the amount of urea-ammonium nitrate present in the aqueous solution by about 1 to about 10 percent, when the aqueous solution contains such compound, and thereafter incorporate that amount, e.g. from about 1 to about 10 percent, of urea, ammonium nitrate, or mixtures of same into the aqueous suspension.

In order to more fully describe the improved, stable, fluid suspension fertilizer compositions and methods for producing same according to the present invention, the following examples are given. However, it is to be understood that the examples are not intended to unduly limit the scope of the invention. In each example, unless otherwise designated, all percentages are percentages by weight.

EXAMPLE

A series of fluid suspension fertilizer compositions were prepared in 10,000 to 16,000 pound lots utilizing a mixing vessel wherein the rim speed of the agitator was about 5,000 feet per minute. To the mixing vessel was added the aqueous solution, either water or an aqueous solution containing urea-ammonium nitrate or both. Thereafter, the agitator and a recirculation pump were activated. Monoammonium phosphate was added to the aqueous solution to form an aqueous dispersion containing the monoammonium phosphate. Thereafter, the ammonia was injected into the mixing vessel at the rate of about 50 pounds per minute until the desired amount of ammonia had been incorporated therein. Clay was then introduced into the reaction vessel to adjust the viscosity of the resultant fluid suspension fertilizer to the desired level. When desired, potash, the unrefined potash known as muriate of potash, was incorporated into the composition and the mixture was stirred until a substantially homogeneous product was formed.

The fluid suspension fertilizer compositions so produced were analyzed and tested to determine the degree of settling which occurred on standing. To determine the amount of settling samples of the fluid suspension fertilizer compositions were placed in columns and the compositions maintained at the desired temperature. The settling rate of each of the suspension fertilizer compositions was determined over a period of 13 days and such rate was expressed as the percent of clear liquid appearing on the upper portion of the column during the settling period. The constituents employed in formulating each of the fertilizer compositions and the amount of settling which occurred during the test period for each composition are set forth hereinbelow.

The fluid suspension fertilizer compositions so produced were further analyzed and tested to determine the degree of salting out which occurred at various temperatures. To determine the amount of salting out at various temperatures the solids content as a weight percent of total weight was determined by vacumn filtration of the sample at 100° F., 50° F., and 30° F.

COMPOSITION 1

| INGREDIENTS | AMOUNT OF INGREDIENTS EMPLOYED (LBS.) | % SALTING OUT 100° F | 50° F | 30° F | 3 Hrs | 24 Hrs | % SETTLING 3 Days | 7 Days | 13 Days |
|---|---|---|---|---|---|---|---|---|---|
| Water | — | 2.68 | 3.01 | 3.12 | Trace | 1.25 | 1.875 | 3.125 | 5.0 |
| Aqueous solution of Urea-Ammonium Nitrate* | 1570 | | | | | | | | |
| Monoammonium phosphate | 347 | | | | | | | | |
| Ammonia | 27 | | | | | | | | |
| Clay | 56 | | | | | | | | |
| Potash | — | | | | | | | | |

*SOLUTION HAD TOTAL NITROGEN CONTENT OF 28 PERCENT

COMPOSITION 2

| INGREDIENTS | AMOUNT OF INGREDIENTS EMPLOYED (LBS.) | % SALTING OUT 100° F | 50° F | 30° F | 3 Hrs | 24 Hrs | % SETTLING 3 Days | 7 Days | 13 Days |
|---|---|---|---|---|---|---|---|---|---|
| Water | 603 | 5.84 | 5.95 | 6.01 | 0 | 3.125 | 11.875 | 16.25 | 18.75 |
| Aqueous solution of Urea-Ammonium Nitrate* | — | | | | | | | | |
| Monoammonium phosphate | 1308 | | | | | | | | |
| Ammonia | 69 | | | | | | | | |
| Clay | 20 | | | | | | | | |
| Potash | — | | | | | | | | |

*SOLUTION HAD TOTAL NITROGEN CONTENT OF 28 PERCENT

COMPOSITION 3

| INGREDIENTS | AMOUNT OF INGREDIENTS EMPLOYED (LBS.) | % SALTING OUT 100° F | 50° F | 30° F | 3 Hrs | 24 Hrs | % SETTLING 3 Days | 7 Days | 13 Days |
|---|---|---|---|---|---|---|---|---|---|
| Water | 73 | 6.27 | 7.09 | 7.11 | 0.625 | 0.625 | 2.50 | 4.375 | 5.000 |
| Aqueous solution of Urea-Ammonium Nitrate* | 1071 | | | | | | | | |
| Monoammonium phosphate | 231 | | | | | | | | |
| Ammonia | 18 | | | | | | | | |
| Clay | 40 | | | | | | | | |
| Potash | 567 | | | | | | | | |

*SOLUTION HAD TOTAL NITROGEN CONTENT OF 28 PERCENT

COMPOSITION 4

| INGREDIENTS | AMOUNT OF INGREDIENTS EMPLOYED (LBS.) | % SALTING OUT 100° F | 50° F | 30° F | 3 Hrs | 24 Hrs | % SETTLING 3 Days | 7 Days | 13 Days |
|---|---|---|---|---|---|---|---|---|---|
| Water | 109 | 6.41 | 6.41 | 6.41 | 0.625 | 1.250 | 1.875 | 2.500 | 2.500 |
| Aqueous solution of Urea-Ammonium Nitrate* | 952 | | | | | | | | |
| Monoammonium phosphate | 308 | | | | | | | | |
| Ammonia | 24 | | | | | | | | |
| Clay | 40 | | | | | | | | |
| Potash | 567 | | | | | | | | |

*SOLUTION HAD TOTAL NITROGEN CONTENT OF 28 PERCENT

COMPOSITION 5

| INGREDIENTS | AMOUNT OF INGREDIENTS EMPLOYED (LBS.) | % SALTING OUT 100° F | 50° F | 30° F | 3 Hrs | 24 Hrs | % SETTLING 3 Days | 7 Days | 13 Days |
|---|---|---|---|---|---|---|---|---|---|
| Water | 247 | 6.16 | 6.66 | 6.69 | 0 | 0.625 | 1.250 | 2.500 | 5.000 |
| Aqueous solution of Urea-Ammonium Nitrate* | 665 | | | | | | | | |
| Monoammonium phosphate | 539 | | | | | | | | |
| Ammonia | 42 | | | | | | | | |
| Clay | 40 | | | | | | | | |
| Potash | 467 | | | | | | | | |

*SOLUTION HAD TOTAL NITROGEN CONTENT OF 28 PERCENT

COMPOSITION 6

| INGREDIENTS | AMOUNT OF INGREDIENTS EMPLOYED (LBS.) | % SALTING OUT | | | % SETTLING | | | | |
|---|---|---|---|---|---|---|---|---|---|
| | | 100° F | 50° F | 30° F | 3 Hrs | 24 Hrs | 3 Days | 7 Days | 13 Days |
| Water | 206 | 6.10 | 6.22 | 6.22 | 0 | 0.313 | 1.250 | 1.875 | 1.875 |
| Aqueous solution of Urea-Ammonium Nitrate* | 856 | | | | | | | | |
| Monoammonium phosphate | 462 | | | | | | | | |
| Ammonia | 36 | | | | | | | | |
| Clay | 40 | | | | | | | | |
| Potash | 400 | | | | | | | | |

*SOLUTION HAD TOTAL NITROGEN CONTENT OF 28 PERCENT

COMPOSITION 7

| INGREDIENTS | AMOUNT OF INGREDIENTS EMPLOYED (LBS.) | % SALTING OUT | | | % SETTLING | | | | |
|---|---|---|---|---|---|---|---|---|---|
| | | 100° F | 50° F | 30° F | 3 Hrs | 24 Hrs | 3 Days | 7 Days | 13 Days |
| Water | 164 | 4.91 | 5.26 | 5.36 | 0.3125 | 0.625 | 1.250 | 1.875 | 2.50 |
| Aqueous solution of Urea-Ammonium Nitrate* | 1047 | | | | | | | | |
| Monoammonium phosphate | 385 | | | | | | | | |
| Ammonia | 30 | | | | | | | | |
| Clay | 40 | | | | | | | | |
| Potash | 334 | | | | | | | | |

*SOLUTION HAD TOTAL NITROGEN CONTENT OF 28 PERCENT

COMPOSITION 8

| INGREDIENTS | AMOUNT OF INGREDIENTS EMPLOYED (LBS.) | % SALTING OUT | | | % SETTLING | | | | |
|---|---|---|---|---|---|---|---|---|---|
| | | 100° F | 50° F | 30° F | 3 Hrs | 24 Hrs | 3 Days | 7 Days | 13 Days |
| Water | 61 | 4.26 | 5.35 | 5.39 | 0.63 | 0.625 | 0.625 | 2.500 | 2.500 |
| Aqueous solution of Urea-Ammonium Nitrate* | 1333 | | | | | | | | |
| Monoammonium phosphate | 154 | | | | | | | | |
| Ammonia | 12 | | | | | | | | |
| Clay | 40 | | | | | | | | |
| Potash | 400 | | | | | | | | |

*SOLUTION HAD TOTAL NITROGEN CONTENT OF 28 PERCENT

COMPOSITION 9

| INGREDIENTS | AMOUNT OF INGREDIENTS EMPLOYED (LBS.) | % SALTING OUT | | | % SETTLING | | | | |
|---|---|---|---|---|---|---|---|---|---|
| | | 100° F | 50° F | 30° F | 3 Hrs | 24 Hrs | 3 Days | 7 Days | 13 Days |
| Water | 662 | 5.05 | 5.05 | 5.05 | 0 | 1.250 | 1.875 | 3.125 | 5.000 |
| Aqueous solution of Urea-Ammonium Nitrate* | 0 | | | | | | | | |
| Monoammonium phosphate | 462 | | | | | | | | |
| Ammonia | 36 | | | | | | | | |
| Clay | 40 | | | | | | | | |
| Potash | 800 | | | | | | | | |

*SOLUTION HAD TOTAL NITROGEN CONTENT OF 28 PERCENT

The above data clearly indicates that a stable, fluid, suspension fertilizer composition can be provided wherein monoammonium phosphate is employed as the sole source of the phosphate in the fertilizer compositions. Further, the data clearly indicates that only nominal amounts of settling or "salting out" occurs even though the temperature of the particular composition may vary widely.

Such settling as occurs is from compaction of the suspension gel and resulting displacement of the liquid phase of the gel. The product can be easily reconstituted to the original conditions of stability, fluidity, and uniformity by simple agitation or recirculation as proven in practice.

It should be further noted that the order of ingredients added to the mixing vessel can be varied widely. For example, the aqueous solution can be added to the mixing vessel in a sufficient amount to cover the agitator. Thereafter, the clay constituent can be incorporated into the water followed by the addition of monoammonium phosphate, ammonia, potash, and the like. When the desired formulation permits and/or requires a small quanity of ammonia so that the addition of the ammonia does not generate the desired heat of reaction, a suitable suspension can be formed by adding a portion of the aqueous solution to the mixing vessel, exercising care to insure coverage of the agitator by the aqueous solution, and thereafter adding the monoammonium phosphate constituted and the ammonia. After ammoniation has been completed, the remaining ingredients can be added, as desired.

While this invention has been explained in relation to certain specific embodiments, it is to be understood that various modifications thereof will now become apparent to those skilled in the art upon reading the Specifications, and it is intended to cover such modifications as fall within the scope of the appended claims.

What is claimed is:

1. An improved, stable fluid suspension fertilizer composition produced by admixing into an aqueous medium from about 8 to about 75 weight percent monoammonium phosphate, from about 1 to about 6 weight percent ammonia, from about 1 to about 3 weight percent clay particles and from 0 to about 50 weight percent potash at a temperature of less than about 130° F, said mixing being at a rate sufficient to shear said clay particles, said composition having total equivalant water in the range of from about 25 to about 60 weight percent and a mole ratio of ammonia to phosphoric acid equivalent in the range of from about 1.2:1 to about 1.8:1, the phosphoric acid equivalent being derived essentially from granular or particulate monoammonium phosphate.

2. The improved, stable fluid suspension fertilizer composition of claim 1 wherein said aqueous medium is selected from the group consisting of water, an aqueous urea-ammonium nitrate solution wherein the nitrogen content of said solution is from about 28 to about 32 percent, and a mixture of water and said aqueous urea-ammonium nitrate solution wherein said aqueous urea-ammonium nitrate solution is present in an amount of up to about 80 percent of said aqueous medium.

3. The improved, stable fluid suspension fertilizer composition of claim 2 wherein said aqueous medium contains from about 2 to about 53 weight percent of said urea-ammonium nitrate solution, said monoammonium phosphate is present in an amount of from about 8 to 27 weight percent, said ammonia is present in an amount of about 1 to about 3 weight percent, said clay is present in about 2 weight percent, and said potash is muriate of potash and is present in an amount of from about 23 to about 40 weight percent.

4. The improved, stable fluid suspension fertilizer composition of claim 3 wherein said monoammonium phosphate has a particle size of not greater than about 0.25 inches in diameter.

5. The improved, fluid stable suspension fertilizer composition of claim 4 which includes from about 1 to about 2 weight percent of a compound having nutrient properties and a negative heat of solution.

6. The improved, fluid stable suspension fertilizer composition of claim 5 wherein said compound is selected from the group consisting of ammonium nitrate, urea, potassium chloride, potassium sulfate, potassium magnesium sulfate, and potassium phosphate.

7. A single step method for producing a stable, fluid suspension fertilizer composition having a total equivalent water content of from about 25 to 40 weight percent which comprises admixing into an aqueous solution in an agitator-equipped mixing vessel wherein the rim speed of said agitator is maintained at a speed of at least 5,000 feet per minute and the temperature is maintained at less than about 130° F., the following ingredients:
(a) from about 8 to about 75 weight percent monoammonium phosphate;
(b) an amount of ammonia effective to provide a mole ratio of ammonia to phosphoric acid equivalent in the range of from about 1.2:1 to about 1.8:1, the phosphoric acid equivalent being derived essentially from granular or particulate monoammonium phosphate;
(c) from about 1 to about 3 weight percent clay; and,
(d) from 0 to about 50 weight percent potash.

8. The method for producing a stable, fluid suspension fertilizer composition according to claim 7 wherein said aqueous solution is selected from the group consisting of water, an aqueous urea-ammonium nitrate solution wherein the nitrogen content of said solution is from about 28 to about 32 percent, and a mixture of water and said aqueous urea-ammonium nitrate solution wherein said aqueous urea-ammonium nitrate solution is present in an amount of up to about 80 percent of said aqueous solution.

9. The method for producing a stable, fluid suspension fertilizer composition according to claim 8 wherein said aqueous solution contains from about 2 to about 53 weight percent of said aqueous urea-ammonium nitrate solution, said monoammonium phosphate is present in the amount of from about 8 to about 27 weight percent, and said ammonia is employed in an amount of from about 1 to about 6 weight percent and said ammonia is added at a rate sufficient to prevent the temperature of the reaction product from exceeding about 130° F. and temperature of final product from exceeding about 100° F.

10. The method for producing a stable, fluid suspension fertilizer composition according to claim 9 wherein said potash is muriate of potash and is incorporated into said aqueous solution in an amount of from about 23 to about 40 weight percent.

11. The method for producing a stable, fluid suspension fertilizer composition according to claim 9 which includes incorporating into said aqueous solution to maintain the temperature of the reaction product at a temperature of less than about 100° F. from about 1 to about 10 weight percent of a compound having nutrient properties and a negative heat of solution.

12. The method for producing a stable, fluid suspension fertilizer composition according to claim 11 wherein said compound is selected from the group consisting of ammonium nitrate, urea, potassium sulfate, potassium chloride, potassium magnesium sulfate, and potassium phosphate.

* * * * *